United States Patent
De et al.

(10) Patent No.: US 10,216,501 B2
(45) Date of Patent: Feb. 26, 2019

(54) GENERATING CODE IN STATICALLY TYPED PROGRAMMING LANGUAGES FOR DYNAMICALLY TYPED ARRAY-BASED LANGUAGE

(71) Applicant: The MathWorks, Inc., Natick, MA (US)

(72) Inventors: Arnab De, Brighton, MA (US); Frederick M. Smith, Natick, MA (US); Denis Gurchenkov, Needham, MA (US)

(73) Assignee: The MathWorks, Inc., Natick, MA (US)

( * ) Notice: Subject to any disclaimer, the term of this patent is extended or adjusted under 35 U.S.C. 154(b) by 0 days.

(21) Appl. No.: 15/168,990

(22) Filed: May 31, 2016

(65) Prior Publication Data
US 2016/0357533 A1    Dec. 8, 2016

Related U.S. Application Data

(60) Provisional application No. 62/171,011, filed on Jun. 4, 2015.

(51) Int. Cl.
*G06F 8/51*    (2018.01)
*G06F 8/41*    (2018.01)

(52) U.S. Cl.
CPC ............. *G06F 8/51* (2013.01); *G06F 8/437* (2013.01)

(58) Field of Classification Search
CPC .................................. G06F 8/51; G06F 8/437
USPC ........................................................ 717/137
See application file for complete search history.

(56) References Cited

U.S. PATENT DOCUMENTS

| | | | | |
|---|---|---|---|---|
| 5,890,150 | A | * | 3/1999 | Ushijima .......... G06F 17/30536 707/714 |
| 5,950,007 | A | * | 9/1999 | Nishiyama ............ G06F 8/4442 717/146 |
| 6,149,318 | A | * | 11/2000 | Chase ..................... G06F 8/437 717/131 |
| 6,504,554 | B1 | * | 1/2003 | Stone ........................ G06F 8/51 707/E17.117 |

(Continued)

OTHER PUBLICATIONS

Ishizaki et al., "Adding Dynamically-Typed Language Support to a Statically-Typed Language Compiler: Performance Evaluation, Analysis, and Tradeoffs", Mar. 2012, ACM (Year: 2012).*

(Continued)

*Primary Examiner* — Wei Y Zhen
*Assistant Examiner* — Junchun Wu
(74) *Attorney, Agent, or Firm* — Harrity & Harrity, LLP

(57) ABSTRACT

Described are methods, systems and computer-readable media storing instructions that when executed on one or more processors execute a process for generating second program code in a statically typed programming language from first program code in a dynamically typed programming language. The first program code contains or, when executed, generates or operates on a dynamically typed array. The second program code may be generated by classifying the dynamically typed array into one of multiple categories, such as homogeneous, heterogeneous, or another, based on the array contents, array usage, and/or user input, and generating the second program code in the statically typed programming language based on the classification(s).

20 Claims, 5 Drawing Sheets

(56) References Cited

U.S. PATENT DOCUMENTS

| | | | |
|---|---|---|---|
| 7,062,761 B2* | 6/2006 | Slavin | G06F 8/31 717/150 |
| 7,086,041 B2* | 8/2006 | Plesko | G06F 8/437 717/141 |
| 7,240,338 B1* | 7/2007 | Bell | G06F 8/51 717/137 |
| 7,698,703 B2* | 4/2010 | Sachdeva | G06F 9/44521 717/176 |
| 7,853,603 B2* | 12/2010 | Churin | G06F 17/3053 707/748 |
| 7,933,908 B1 | 4/2011 | Perkins et al. | |
| 8,359,586 B1 | 1/2013 | Orofino, II et al. | |
| 8,375,355 B2* | 2/2013 | Mercer | G06F 9/4494 717/136 |
| 8,510,366 B1* | 8/2013 | Anderson | G06F 9/5066 717/149 |
| 8,966,456 B2 | 2/2015 | Foti | |
| 2003/0145312 A1* | 7/2003 | Bates | G06F 8/30 717/152 |
| 2004/0111708 A1* | 6/2004 | Calder | G06F 11/3447 717/131 |
| 2004/0181783 A1* | 9/2004 | Nagata | G06F 8/51 717/137 |
| 2006/0005143 A1* | 1/2006 | Sakkinen | G06F 3/0481 715/772 |
| 2006/0156286 A1* | 7/2006 | Morgan | G06F 8/51 717/124 |
| 2006/0218538 A1* | 9/2006 | van Kesteren | G06F 9/4493 717/137 |
| 2006/0225053 A1* | 10/2006 | Lakshman | G06F 8/437 717/140 |
| 2008/0016108 A1 | 1/2008 | Aspinall | |
| 2008/0022267 A1* | 1/2008 | Johnson, Jr. | G06F 8/38 717/143 |
| 2009/0199169 A1* | 8/2009 | Lin | G06F 8/443 717/159 |
| 2009/0293045 A1* | 11/2009 | Cheriton | G06F 8/443 717/136 |
| 2010/0275187 A1* | 10/2010 | Mercer | G06F 9/4494 717/140 |
| 2011/0131556 A1* | 6/2011 | Tatsubori | G06F 8/30 717/137 |
| 2013/0013345 A1* | 1/2013 | Wallquist | G06Q 10/0635 705/4 |
| 2013/0298111 A1* | 11/2013 | Koseki | G06F 8/51 717/137 |
| 2014/0157243 A1* | 6/2014 | Vargas | G06F 8/51 717/137 |

OTHER PUBLICATIONS

Abadi et al., "Dynamic Typing in a Statically Typed Language", Apr. 1991, ACM, vol. 13, No. 2, pp. 237-268. (Year: 1991).*

Slowinska et al., "Howard: a dynamic excavator for reverse engineering data structures", Feb. 2011, Internet Society (Year: 2011).*

Li et al., "Mc2FOR: A Tool for Automatically Translating MATLAB to FORTRAN 95", 2014, IEEE (Year: 2014).*

* cited by examiner

GENERATING CODE IN STATICALLY TYPED PROGRAMMING LANGUAGES FOR DYNAMICALLY TYPED ARRAY-BASED LANGUAGE

CROSS-REFERENCE TO RELATED APPLICATIONS

This application claims the benefit of priority to U.S. Provisional Application No. 62/171,011, filed Jun. 4, 2015, the contents of which are incorporated herein by reference.

COPYRIGHT NOTICE

A portion of the disclosure of this document contains material that is subject to copyright protection. The copyright owner has no objection to the facsimile reproduction by anyone of the patent document or the patent disclosure, as it appears in the Patent and Trademark Office patent file or records, but otherwise reserves all copyright works whatsoever.

BACKGROUND

Many programming languages, including graphical programming languages and textual programming languages provide support for dynamically typed array-based, programming. Array-based languages can be used to solve many different mathematical and scientific computing problems. Examples of computing environments employing a dynamically typed, matrix-based mathematical programming language are Julia, Python™, and MATLAB® and Simscape™ software by The MathWorks, Inc. of Natick, Mass.

In a dynamically typed programming environment ("DTPE"), data types can be assigned to each data value in memory at runtime, rather than assigning a type to a static, syntactic entity in the program source code. The DTPE can discover errors related to the misuse of values at the time the erroneous statement or expression is executed. In contrast, in a statically typed programming environment ("STPE"), types can be assigned to sets of values, program variables, and expressions based on the program's source code. Static type disciplines can operate on program source code rather than on the program execution. Therefore, in the STPE, certain kinds of errors can be detected without executing the program.

Dynamically typed programming languages ("DTPLs") can operate on numeric arrays, e.g., vectors and matrices, character arrays, cell arrays, and arrays of objects. Numeric arrays and character arrays include only homogeneous data. Cell arrays, which are programming constructs having indexed data containers called cells, may contain any data of any type and of any size supported by the data processing software. Examples of different types of data can include: logical data, character data, various types of numeric data (e.g., numeric scalar data and numeric arrays), other cell arrays, structures, java classes, function handles, and any new data types created using an object-oriented class definition (e.g., any new data types created using a MATLAB® object system, such as, for example, MATLAB® oops, udd, and mcos object systems.) Cell arrays of DTPLs cannot currently be directly represented in statically typed programming languages ("STPLs").

SUMMARY

In one embodiment, a computer-readable medium holding processor-executable instructions for generating program code may be provided. When executed by one or more processors, the instructions may cause the one or more processors to perform a computer-implemented method of generating second program code in a statically typed programming language from first program code in a dynamically typed programming language. The first program code may contain or, when executed, generate or operate on a dynamically typed array. The dynamically typed array may be classified into one of multiple categories, based on the array contents, array usage, or user input. The second program code in the statically typed programming language may be generated based on the classifying. The multiple categories may comprise homogeneous, heterogeneous, table, or other classifications. The first program code may be analyzed to determine if index values used to index into the one or more dynamically typed arrays are constant and remain constant during execution of the first program code, and using those index values that are constant to aid in the classifying.

In another embodiment, the classifying may comprise selecting one or more classification rules from a set of rules for application based on a performance preference for the second program code, and/or based on a visual readability preference for the second program code. The method may comprise assigning to the dynamically typed array a homogeneous or heterogeneous classification from user input that overrides any automated classification operations performed by the one or more processors.

In yet another embodiment, the method for generating program code may comprise generating an intermediate representation from the first program code and modifying the intermediate representation based on the classification. A dynamically typed intermediate representation of the first program code may be generated, which may be transformed into a statically typed intermediate representation. The statically typed intermediate representation may be converted into the second program code in a statically typed programming language.

In another embodiment, the dynamically typed array may be converted into a statically typed intermediate representation, such as an array, a structure, or hash table data structure containing statically typed elements. Constant propagation or constant folding may be employed to aid in converting the first program code operating on the dynamically typed array into the statically typed intermediate representation. Function specialization, loop unrolling, and/or type unification may be used to aid in converting the first program code operating on the dynamically typed array into the statically typed intermediate representation.

In yet another embodiment, the generating the second program code comprises determining a static data type for each dynamically typed array, then using the determined type to aid in generating the second program code. A type inference technique may be applied to determine types for each dynamically typed array. The second program code may comprise a representation of the one or more dynamically typed arrays, and when the second program is executed, the representation in computer memory may not contain any metadata.

In still another embodiment, a system for generating program code may be provided, comprising one or more processors configured to generate second program code in a statically typed programming language, from first program code in a dynamically typed programming language, the first program code containing or, when executed, generating or operating on a dynamically typed array. The one or more processors may generate the second program code by classifying the dynamically typed array into one of multiple categories, based on the array contents, array usage, or user input, and generating the second program code in the statically typed programming language based on the classifying. The system may include a memory for storing the first or second program codes, and a display device.

BRIEF DESCRIPTION OF THE FIGURES

The foregoing and other features of the implementations will be apparent from the following, more particular description of exemplary embodiments of the implementations, as illustrated in the accompanying figures, wherein like reference numbers generally indicate identical, functionally similar, and/or structurally similar elements in different views. The figures are not necessarily to scale, emphasis instead being placed upon illustrating the principles of the embodiments, wherein.

DETAILED DESCRIPTION

The following detailed description of example implementations refers to the accompanying figures noted above.

I. Overview

Figure 1:
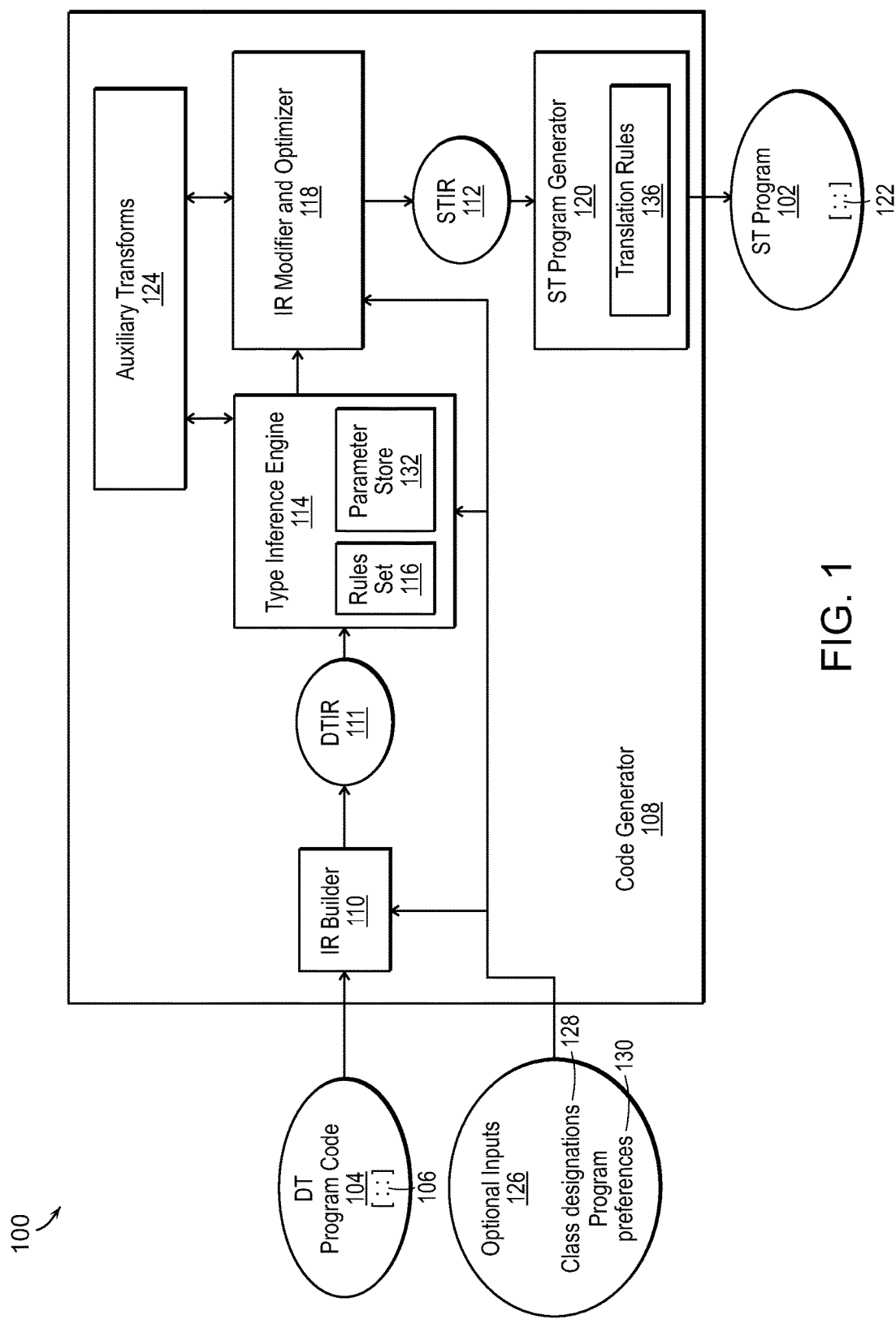
FIG. 1 is an exemplary block diagram illustrating an environment for practicing the illustrative embodiment.

FIG. 1 is a block diagram 100 illustrating at a high level an exemplary embodiment of methods and devices for generating program code 102 in a STPL from an input program code 104 in DTPL including one or more dynamically typed arrays 106. In some implementations, the program code 104 does not explicitly include any dynamically typed arrays, but instead, when executed, generates or operates on one or more dynamically typed arrays 106. The input 104 may be generated or received as user input from a computing environment as programming source code, or another dynamically typed form. A code generator 108 may include a functional component illustrated as an intermediate representation (IR) builder 110 that generates IR for the received program code 104. The generated IR can be a dynamically typed intermediate representation (DTIR) 111. The code generator 108 may also include a type inference engine 114 that can classify the one or more arrays 106 associated with the program code 104 into classes including a homogeneous class, a heterogeneous class, or others, based on the IR and using a set of classification rules 116. Based on the classification, an IR modifier and/or IR optimizer 118 modifies the IR 111 generated by the IR builder 110, thus producing statically typed intermediate representation (STIR) 112. A statically typed program generator 120 generates statically typed program code 102 using the modified IR 112 for the input program code 104. The statically typed program code 102 can include one or more statically typed arrays 122 that correspond to the one or more dynamically typed arrays 106, or when executed, can generate one or more statically typed arrays 122. In addition, the code generator 108 can also include auxiliary transforms 124 that interact with each of the IR builder 110, the type inference engine 114, the IR modifier and/or optimizer 118, and the statically typed program generator 120. The auxiliary transforms 124 can enhance the applicability of the classifications and intermediate representations to real-world programs. Those of skill in the art will readily appreciate that the description which follows is not intended to limit the scope of the disclosure to having all of the functional components and/or rules integrated into a single, co-located unit. For example, distributed computing implementations would permit the classification rules 116, transforms 124, and/or any of the particular functions to be stored remotely, and accessed as necessary. The code generator 108 may not include all parts/functionalities shown in the figure. Some of the parts/functionalities can be provided outside of the code generator.

The IR builder 110 may use the classification(s) of the dynamically typed arrays 106 to convert a dynamically typed intermediate representation (DTIR) 111 of program code 104 into STIR 112. The intermediate representations allow for the processing of translation tasks associated with converting dynamically typed program code 104 into statically typed program code 102 in discrete stages. The DTIR and STIR model individual behaviors, such as usage patterns, relevant to the cell array(s) associated with or in the respective source and target programming languages.

In some implementations, the translation of program code 104 into STIR can be performed by techniques including one or more of building intermediate representations (IRs), modifying and/or optimizing the IRs, and applying static type inference on the (modified/optimized) IRs. Such technologies are incorporated in tools including the MATLAB Coder with its type inference engine, the Stateflow® state-based and flow diagram environment (integrated within Simulink®) and/or the Real-Time Workshop® coder, each offered by The MathWorks of Natick, Mass., and useful in modeling complex behaviors using finite state machine theory, flow diagram notations, and state-transition diagrams. For example, the translation process can include steps to identify a particular construct or array 106 access pattern in the program code 104 and represent the construct or access pattern in a DTIR, e.g., as a node or path in a control and/or data flow graph. The program code 104 can be converted to a STIR 112, e.g., in which the construct or access pattern is represented by representations that comply with syntax and/or rules of the target programming language and that exhibit the same structure or behavior. The translation to STIR may be performed automatically, and/or be triggered with features selected based on preferences or objectives related to the program code, e.g., those contained in input 126. The information contained within STIR may be used for subsequent generation of statically typed program code 102 in the target language.

The statically typed program generator 120 can translate the STIR into the program code 102 written in a STPL that may include or, when executed generate, a statically typed array 122 or a statically typed structure or a statically typed hash table corresponding to the dynamically typed array 106. The output program code 102 can be used by an external compiler to generate executable code for hardware or other processing. Those skilled in the art will recognize that a plurality of source DTPLs and target STPLs can be employed based upon the needs of the user.

Illustrative implementations described below provide methods and devices for automatically translating dynamically typed, array based program code 104 created using one of a variety of source DTPLs that employ cell arrays or equivalent dynamic data types, such as Julia, Python™, MATLAB® and Simscape™ into program code 102 including arrays, structures and hash tables in a STPL such as C, C++ and HDL, and/or into STIRs that are suitable for translation into such languages. In some implementations, cell arrays are used to represent property/value pairs, arrays of data strings, arrays of matrices of different sizes, e.g., with the same base type, collections of objects of different types, arrays of arrays, or variable-sized arrays of structures having variable sized fields. The cell arrays may be explicitly contained in the program code 104 or may be generated by the program code 104 when the input is executed. In some implementations, a classification syntax that leverages the cell array and math-oriented nature of a DTPL is utilized. The code generator 108 may be implemented on one or more processors that execute instructions for classifying arrays and translating the program code 104 to program code 102 based on the classification, and optionally also for meeting one or more code quality objectives or other preferences.

II. Exemplary Programming Language & Computing Environment

Figure 2:
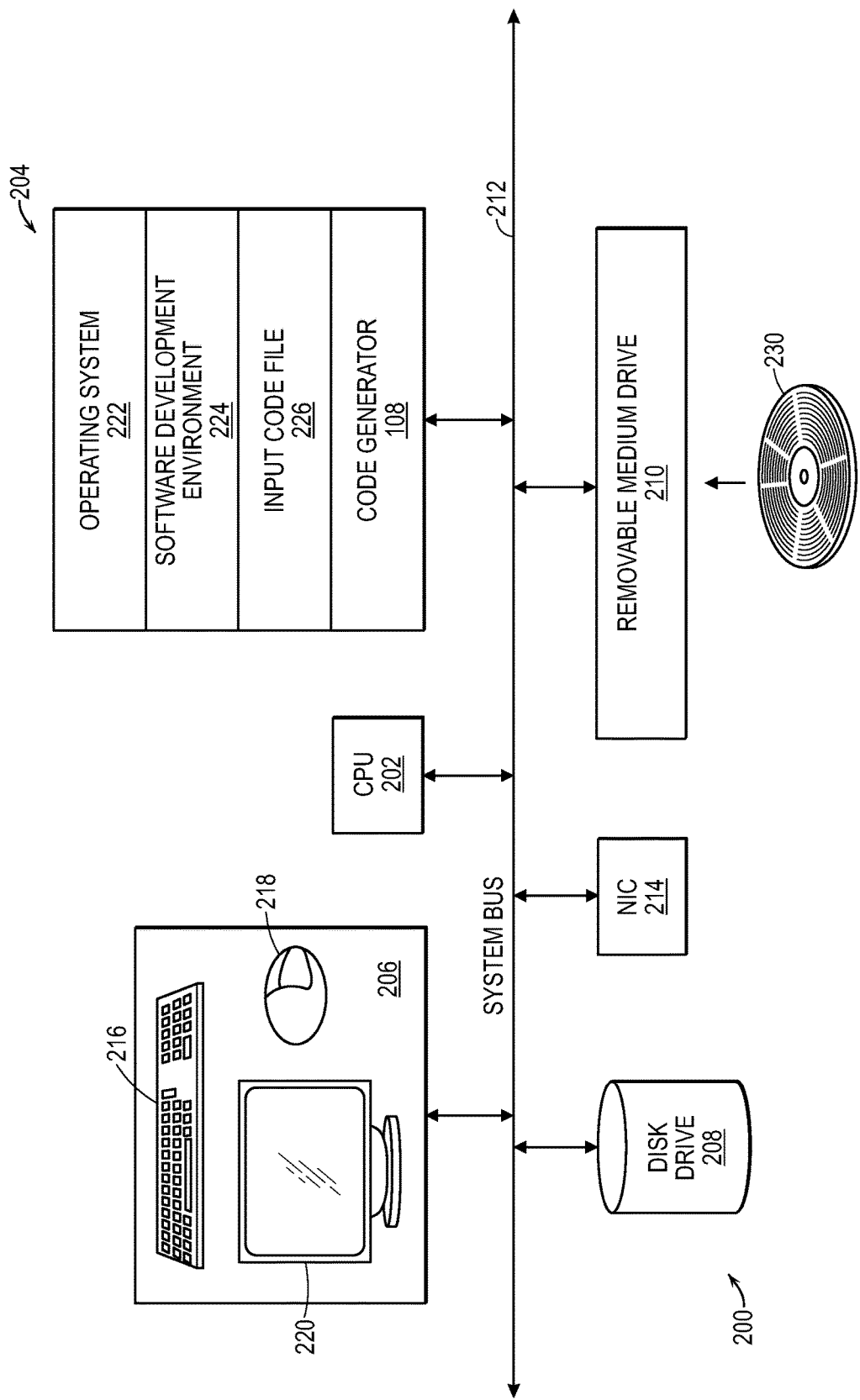
FIG. 2 is a diagram of an example computing environment in which devices and/or methods, described herein, may be implemented.

FIG. 2 illustrates a block diagram of an exemplary computing device 200 that can be used to implement the systems and methods of the present disclosure. The computing device 200 may include a central processing unit (CPU) 202 (that may be equipped with a single processor, a multi-core processor, or multiple processors), a main memory 204, a user interface 206, a disk drive 208, and a removable medium drive 210 that are inter connected by a system bus 212. The CPU 202 controls one or more other components of the computing device 200 to translate input that is in a dynamically typed language into statically typed program code. The computing device 200 may also include a network interface card (NIC) 214. The user interface 206 may include a keyboard 216, a mouse 218 or other input devices, and a display 220. The computing device may receive through one of the input devices data necessary for establishing performance criteria or other preferences for the output program code 102. In some implementations, the criteria or the preferences may be provided as options presented on display 220. Each processor of CPU 202 may be a 32 bit processor, 64 bit processor or another type of processor capable of executing the instructions required for the present implementations. Examples of other processors can include a graphics processing unit (GPU) or application specific hardware that is programmable (Field Programmable Gate Array), tailored to an application domain (Application Specific Instruction set Processor), or custom designed to fit an application (Application Specific Integrated Circuit.) Other computing resources, such as hardware accelerators, can additionally be used to speed up the general processing rate of the computing device 200.

The memory 204 may include a plurality of modules, such as an operating system 222, a software development environment 224, an input file 226, which for example, can be used for storing an embodiment of program code 104, and an embodiment of code generator 108. The removable medium drive 210 may be configured to read a non-transitory computer readable medium 230, such as a CD, DVD, floppy disk, flash memory or other medium storing computer-executable instructions. The removable medium drive 210 may further be configured to write to the computer readable medium 230. Suitable operating systems 222 include the Windows series of operating systems from Microsoft Corp. of Redmond, Wash., the Linux operating system, and the UNIX® operating system, among others.

A user may utilize the keyboard 216, mouse 218 and display 220 of the user interface 206 to interact with the software development environment 224 and create the input file 226. For the purposes of illustration, a number of the examples contained herein are discussed with reference to MATLAB® or Simscape™, array-based DTPLs from The MathWorks, Inc. of Natick, Mass. It should be appreciated that these languages have been chosen merely as examples of DTPLs (others include Julia, Python™, etc.) and the implementations should not be interpreted as being restricted solely thereto. It should also be appreciated that the use of set notation in certain implementations as discussed herein is applicable to other textual and graphical programming languages such as the Unified Modeling Language (UML) and the System Modeling Language (SysML), in addition to being applicable to array-based DTPLs.

Software development environment 224 may include a language processor capable of processing program code in the DTPL. The language processor can be a compiler, an interpreter, a virtual machine, other types of execution engine, or a combination of some or all of the above.

Figure 3:
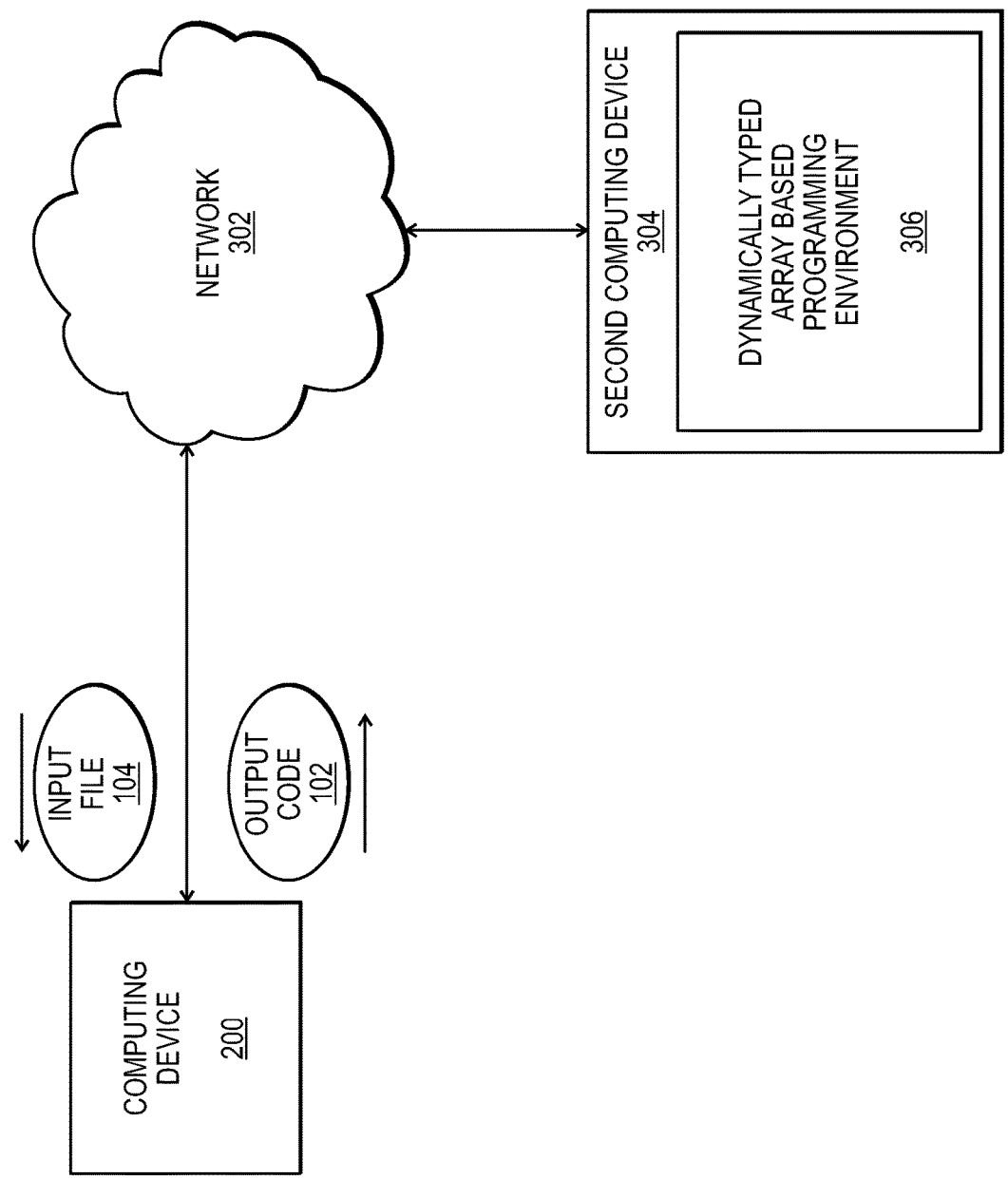
FIG. 3 is a diagram of an example distributed computing environment in which device and/or methods described herein may be implemented.

In some implementations, the computing device 200 does not include any software development environment, such as the environment 224. For example, in a distributed computing architecture embodiment such as architecture 300 shown in FIG. 3, computing device 200 may be configured to perform the functionality of a code generator. The device 200 can receive, through NIC 214 via network 302, dynamically typed, cell array containing or generating program code 104 that is generated remotely relative to the device 200. The device 200 can then generate statically typed program code 102 from the program code 104, based on classifications of the cell array(s) into classes including homogeneous or heterogeneous classes, without further development of the code. Program code 104, in such architectures, may be generated at a network-connected computing device 304 hosting an array-based DTPE 306. Computing device 304 may comprise virtual components, and network 302 may be the Internet, a local area network (LAN), a wide area network (WAN), a wireless network, an intranet, an extranet or another type of network. In some implementations, client computing device 304 may request a server computing device 200 to translate program code 104 that has been generated at client computing device 304. Server computing device 200 may provide the client computing device 200 with software products or components for performing the translation, or a translated program code 102 under a particular condition, such as a license agreement.

III. Example Code Generation Method and Device Implementations

Figure 4:
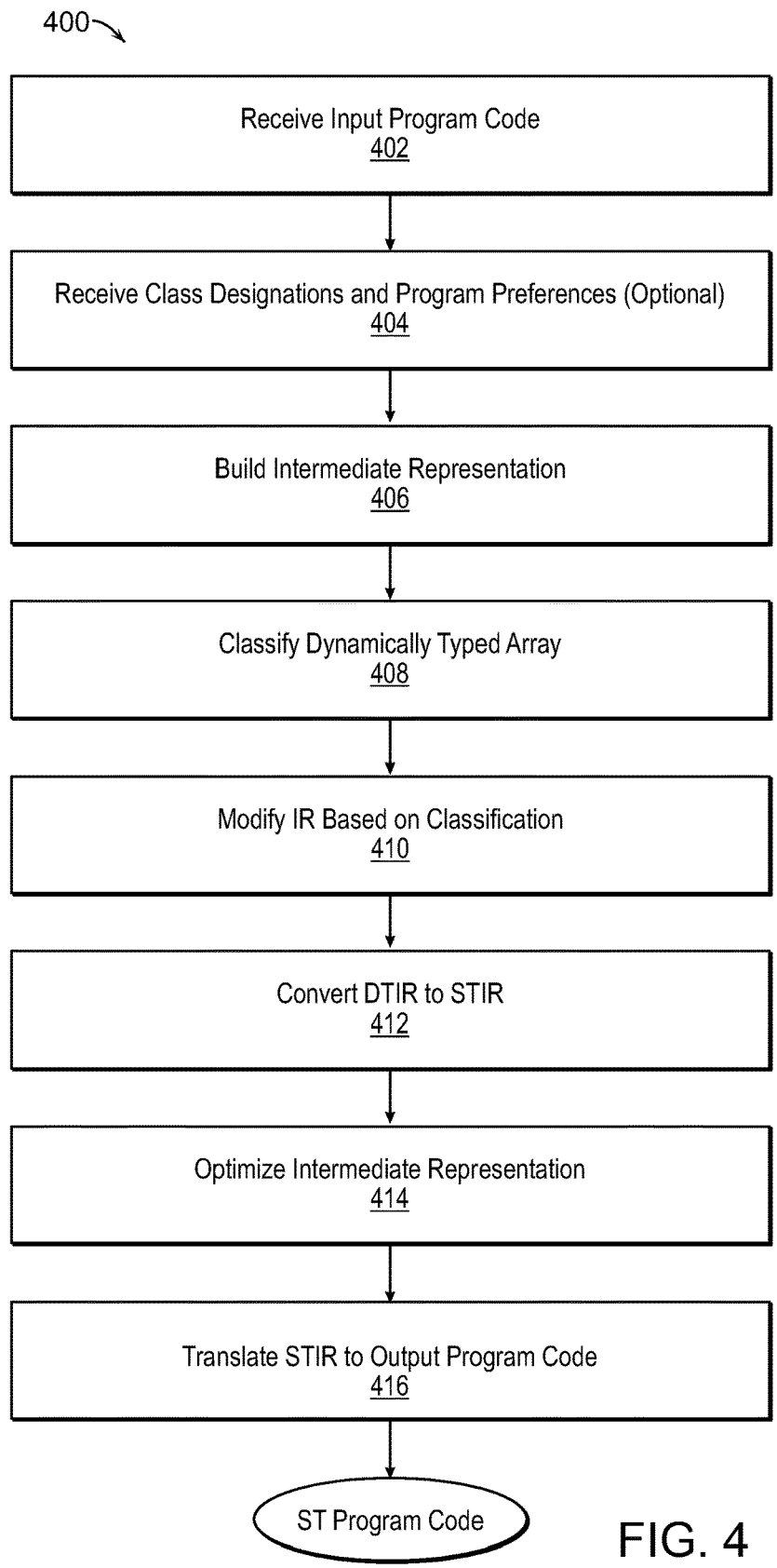
FIG. 4 is a flow diagram of an example implementation of a method of code generation.

With reference to the functional block diagram of FIG. 1 and process flowchart of FIG. 4, illustrative embodiments of a code generator 108 and method 400 describe generating statically typed program code 102 based on classified dynamically typed cell arrays contained within or to be generated from input program code 104 including one or more dynamically typed array(s) 106.

In step 402, code generator 108 receives input program code 104 in a source DTPL. Input program code 104 may be generated automatically by a computing device, or manually by a user, or some combination thereof, in a DTPE. The input program code 104 includes or when executed, generates, at least one dynamically typed array 106, and possibly a plurality of functional elements, each of which corresponds to a particular function or operation, or multiple functions or operations. Examples of functional elements may include graphical blocks, statements, commands, modules, scripts, components, mathematical, logical, statistical or input/output (I/O) operations, filters, or programming constructs or operations, such as IF-THEN-ELSE, etc. The functional elements and their order of execution, if any, may be specified textually, graphically or a combination of textually and graphically, depending on the DTPE being utilized.

The code generator 108 may also receive (step 404) one or more inputs 126, such as class designations 128 and/or program preferences 130, such as desired performance criteria for the program code 102 to be generated. Inputs 126 may, for example, be received from a user through the keyboard 216, mouse 218 and display 220 of the user interface 206. If no inputs 126 are received, code generator 108 may use default class designations and/or criteria. The class designations 128 may include one or more commands to override classification assigned automatically by the type inference engine 114 of code generator 108 for applying to dynamically typed array(s) 106 associated with the input program code 104. The program preferences 130 may include specifications regarding a code quality goal to be achieved or target STPL to be used. The program preferences 130 may include, for example, minimizing the memory requirements of the program code 102 (e.g., minimizing the memory consumed by temporary values, etc.), minimizing the number of invocations or replications of one or more functional elements, maximizing the execution speed of the generated program code 102, minimizing the power requirements of the generated program code 102, etc. The specified criteria may also identify specific classification rules to be selected for application to the dynamically typed array(s) 106. The specified criteria may also include the code language in which the code is to be generated. Program preferences 130 may also include one or more constraints to be satisfied by the generated code 102, e.g., constraints possibly imposed by the particular target device of the implementation, such as a Field Programmable Gate Array (FPGA). The program code 102 can be optimized relative to user specifications or can have the same quality as hand-written code based on user specifications.

In step 406, an IR builder 110 builds a DTIR 111 that capture the semantics for cell array(s) 106. In step 408, the type inference engine 114 of code generator 108 receives the input program code 104 and may automatically classify the dynamically typed array(s) 106 of the input program code 104 as belonging to a class including a homogeneous class or a heterogeneous class, based on cell array contents, usage patterns, and/or user inputs as described previously. This classification affects, e.g., determines, how a dynamically typed array(s) 106 is translated into the generated program code 102.

For the purposes of this disclosure, in some implementations, a variable is an entity that can contain some data, such as, but not limited to, a numerical value, an array or a cell array of values, a string, or an object, etc. When a variable contains multiple elements, such as an array or a cell array, a structure, or an object, the elements themselves may also be referred to as variables.

The variables can contain values during program execution. In some implementations, "types" is introduced to represent commonly accepted classifications of those values. Examples of types include primitive types, such as integers and floating-point numbers, homogeneous or heterogeneous arrays of other types, structural and object types with elements containing other types, etc.

In some implementations, the arrays, e.g., cell arrays, of this disclosure are variables containing collections of elements of similar or different types. These arrays, e.g., cell arrays, can be classified into classes suitable for representation in a statically typed IR. Some examples of arrays are described below.

Figure 5:
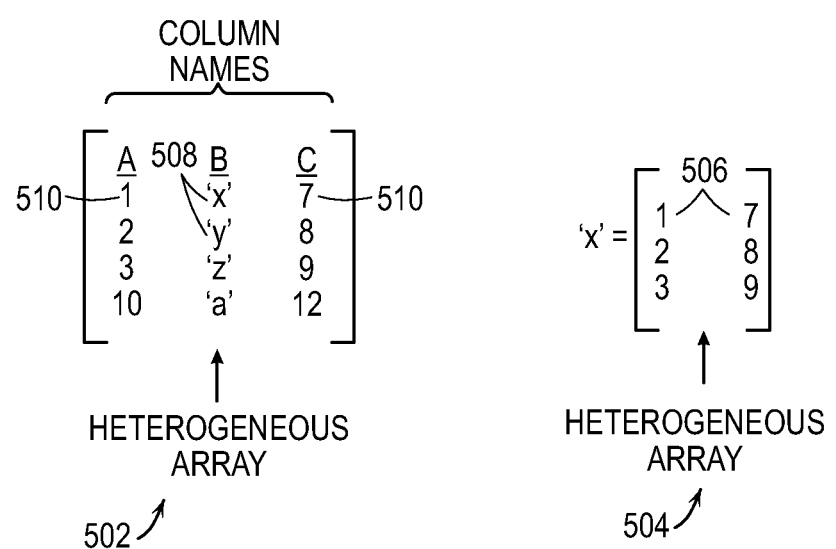
FIG. 5 is an illustration of exemplary heterogeneous and homogeneous cell arrays.

FIG. 5 illustrates examples of a heterogeneous array 502 and a homogeneous array 504. The variables 506 of homogenous array 504 share a number of characteristics. For example, all variables 506 of homogenous cell array 504 may include the same data type (e.g., numbers, etc.). For the heterogeneous array 502, at least one element may include a different data type than at least one other variable. In this example, in heterogeneous array 502, variables 508 of column B have the same data type (i.e., textual data type), while columns A and C have variables 510 of a numeric data type.

Homogenous cell arrays 504 can be of variable size, and can be indexed using an access command (e.g., a brace, dot, or parentheses command, etc.) and an index whose value can be determined at runtime. In some implementations, indexing includes extracting information from data containers, such as homogeneous arrays, heterogeneous arrays, etc. One or more variable(s) of the cell array can be accessed through indices contained in an indexing expression. If the value of the indexing expression is known at compile time, the indexing is sometimes referred to as constant indexing. For example, if c is a cell array, c{1} has a constant index of value 1. If n is an input to the program, then c{n} does not have a constant index, as the value of n is not known at the compile time. Rather, the value of n depends on the program input at run-time.

Heterogeneous cell arrays 502 can include variables (e.g., data elements) that have different data types and/or sizes, etc. The data types associated with heterogeneous arrays 652 may, therefore, be specified for each element 508 individually. A heterogeneous classification of a dynamically typed array 106 is not necessarily less desirable (it depends on the use case), but may require application by code generator 108 of additional translation rules to translate the dynamically typed array 106 into a STIR. For example, in order to index into a heterogeneous array 502, code generator 108 may use a constant index or use for-loops with constant bounds or create specialization of a function with constant inputs. Code generator 108 may support homogeneous arrays and/or heterogeneous arrays of arbitrary types (e.g., arrays of arrays, etc.)

With reference again to FIGS. 1 and 4, the type inference engine 114 of code generator 108 queries the functional elements of input program code 104 and dynamically typed array(s) 106 to parse them based on content and/or usage patterns (e.g., cell array access, etc.). A query function may be configured to obtain parameters of the functional elements of the input program code 104 all at once, sequentially or iteratively, or as necessary, depending on criteria that may be specified in input program preferences 130. The type inference engine 114 may be coupled to and/or have access to a parameter store 132. The query function may also obtain additional information, such as the functional element's preferred traversal order, or the usage or access pattern of a data set or cell array, the functional element's preferred data organization, etc. The results of these analyses are recorded and used in classifying the array(s) 106 (step 408).

The type inference engine 114 may perform the classification process on each variable, on a structure field, on a class property, on a cell in another cell array, or on some other object or entity in the program 102, that may contain a cell array. These variables and other entities together may be referred to as "cell array variables". A cell array variable may have any data type supported by the DTPE employing the matrix-based DTPL. Examples of variables may include: a logical array, a character array, a numeric array (e.g., a vector, a matrix, or a higher-dimensional numeric array), a cell array, a categorical array (discussed below), a time series object, an array of structures, an array of Java classes, an array of function handles, or an array of any new data types created using an object-oriented class definition (e.g., any new data types created using a MATLAB object system, such as, for example, MATLAB oops, udd, and mcos object systems). An element of a variable can be a single datum in the dataset and, as such, may have any data type that is compatible with the array that defines the variable. For example, for a numeric vector variable, the element of the variable may be a scalar number. For a cell array variable, the element of the variable may be any data type compatible with the cell array. For other variables containing homogeneous data, the element of the variable may be any data type the variable requires, such as a logical value, a numeric array (e.g., a vector, matrix, or a higher-dimensional numeric array), a categorical value chosen from a finite set (e.g., red, green, or blue), or an arbitrary text string.

The classification process may involve applying one or more rules from a classification rules set 116 to the cell array(s) 106. The classification may be based on analysis of the usage patterns for each cell array variable. For example, the classification can be based on whether the cell array variables have the same data types, compatible data types, or incompatible data types, and whether accesses to the variables of the cell array use constant or non-constant indices.

An example usage pattern of a cell array includes a program construct or expression of the dynamically typed input program code 104 that reads all values of a dynamically typed cell array 106, or reads the value(s) of some variable(s) of the cell array 106. For example, if c is a cell array, then the statements "y=c", "y=c{1}" and "c{i}=42" are usage patterns of c, but "c=a" is not. Depending on the classification assigned to cell array 106, the cell array may then be translated into homogeneous data structures (e.g., a C array) or a heterogeneous data structure (e.g., a C structure.)

In an exemplary implementation, a cell array variable may be classified using the following one or more rules of the exemplary classification rules set 116, which is by no means intended to limit the manner in which the classification step 408 may be performed:

Rule 1. A cell array may be classified homogeneous IF all cell array variables are of same type. Examples of a homogeneous array include a cell array of numbers, or a cell array of strings, etc.

Rule 2. A cell array may be classified soft homogenizable IF the associated cell array variables have different but similar types, so that an access to an arbitrary variable can be modelled in a statically typed program code without having to realize the differences between variable types. Examples of soft homogenizable arrays include: (a) an array of objects that inherit from the same base type, where variable accesses are modeled via virtual method calls; or (b) an array of matrices of varying sizes, where the base type of all matrices is the same.

Rule 3. A cell array has a regular structure class (e.g., a table structure, etc.), if (a) there is a regular, repeating pattern to the types of the variables of the cell array. For example, each row or column of a cell array contains data of same or compatible types; and (b) indexing along the heterogeneous dimensions of the array uses constant indices, e.g., constant indices only. For example, if the value of the indexing expression is known at compile time, it is constant indexing. If c is a cell array, c{1} has a constant index of value 1. If n in an input to the program, then c{n} does not have a constant index, as the value of n is not known at the compile time. Instead, the value depends on the program input at run-time. An example of a regular structure cell array using the MATLAB language syntax is as follows:

x={John', 32; 'Steve', 44; 'Jina', 11}

The above cell array x has a table structure, where each column has a distinct data type (string or numeric in this case), whereas the entries in each row contain different data types. Rule 4. A cell array is heterogeneous if its elements have incompatible types. For example, a heterogeneous cell array include a mixture of two or more of number(s), character(s), or object(s). In some implementations, for this classifier to be applicable, indexing along all dimensions of the cell array uses constant indices, e.g., constant indices only.

In some implementations, a cell array may be classified in more than one class according to the criteria described above, for instance a cell array may be classified as either heterogeneous or soft homogenizable. When the classification is ambiguous or undeterminable based on the criteria, the type inference engine 114 may use heuristics to pick the classification. In some implementations, the input class designations 128 may include an explicit choice of classifier via pragmas, statements or comments in the input, or via command line parameters or graphical user interface elements. For example, a coder.cstructname command may be invoked for a cell array, classifying the cell array as heterogeneous even if the cell array's elements have compatible types, effectively overriding any automated classification assignment. Similarly, a coder.varsize command could be used to cause the code generator 108 to classify a cell array as homogeneous rather than heterogeneous. The type inference engine 114 can then derive the rest of the classification automatically, but not interfere with the selections made through the class designations 128.

For example, consider the following cell array:

a={'red', 'blue', 'green'}.

Unless coder.varsize is used with cell array a, a is classified as heterogeneous, because the three variables of the cell array have the same base data type, but different sizes. If coder.varsize were used with cell array a, a is classified as homogeneous. For example, if coder.varsize('a') is used, the code generator 108 may determine that each variable of the array has a class "char" and a size 1×:5, that is, variable size with up to 5 elements. In some implementations, the command coder.varsize can be used with a cell array if the code generator 108 can determine a common class and size for all elements.

In some implementations, the classification rules set 116 imposes requirements on cell array accesses. For example, the indices for accessing variables in the cell array fall into a specific pattern or have constant values. It is possible that such indices can give rise to ambiguous classification cases and translation failures. In some implementations, the classification step performed by type inference engine 114 may be aided by invoking a set of auxiliary program transforms 124. In certain implementations, the set of auxiliary transforms 124 may include aggressive function specialization for each call site, constant propagation using full and partial constants, or automatic loop unrolling. The auxiliary transforms 124 can help discover constant values for cell array indices, thus greatly increasing the likelihood that the cell array classification step 408 successfully classifies each cell array.

For each cell array variable, structure field, or object property, type inference engine 114 may execute the following decision sequence after all occurrences, that are explicit or generated from execution of the input 104, of each cell array 106 in the input program code 104 are analyzed:

IF an explicit overriding class designation 128 is received, e.g., provided by a user,
    That designated classifier is used.
    The requirements for each classifier are checked.
ELSE IF all the cell array variables (elements) belong to the same type,
    Example; Scalars Of Double Type Produce a Homogeneous Cell Array
    The cell array is classified as homogeneous (based on Classification Rule 1)
ELSE IF all cell array variables are strings that have varying lengths
    IF all indices are constant,
        The cell array is classified as heterogeneous (based on Classification Rule 1)
    ELSE
        The array is classified as soft-homogeneous with the base type being "variable-sized array of characters" (based on Classification Rule 2)
    END
ELSE IF all indices to the cell elements are constants
    The cell array 106 is classified as heterogeneous (based on Classification Rule 4).
ELSE IF the cell array elements are of different types, but those types are compatible, and can be represented by a common type (an example of how the common type is defined further below)
    The cell array 106 is classified as soft homogeneous with the corresponding (generalized) base type (based on Classification Rule 3).
    Example; A Soft Homogeneous Cell Array Of Matrices Of Varying Sizes
ELSE IF the cell array 106 has regular structure and all usages conform to it (see Regular Structure below)
    The cell array 106 may be classified as regular structure (based on Classification Rule 3),
ELSE
    Compilation is terminated with an error message that directs the user to the indexing expressions that cannot be reduced to constants.
END In the description above, whenever a query is made to determine if an indexing operation into an array uses constant indices, application of the below described Transformation Sequences can be made as to discover the constant indices more frequently.

Example: information is received that a cell array 106 is heterogeneous, so constant propagation is used to ensure all index expressions are constant. For example, in the following sequence of program statements x=1; n=x+1; y=c(n); the indexing expression in c(n) does not appear to be constant. However a constant value of 2 may be propagated to the indexing expression, thereby making it c(2) in the constant propagation algorithm without changing the elements' data types.

In some implementations, Regular Structure is checked based on the following methodologies/processes. The regular structure inside the cell array 106 may be detected, and each dimension may be classified, e.g., as homogeneous, heterogeneous, or other. Uses of the cell array 106 are analyzed, and whether all indices used against heterogeneous dimensions can be reduced to constants is checked.

In certain implementations, type inference engine 114 may apply a sequence of the auxiliary program transforms 124. Some examples are described below.

Transformation Sequence 1 (Constant Propagation Or Constant Folding)

In one particular heterogeneous array (e.g., a multi-dimensional dataset array comprised of rows and columns such as shown in FIG. 5), elements of each column may have the same data type but different columns may have different data types. In some cases, a heterogeneous array may include a row or column of variables having a homogeneous data type. One of the auxiliary program transforms 124 may involve determining constant indexing values for all variables of the dynamically typed cell array 106. A constant propagation optimization may be invoked on an indexing expression, to produce a constant value. In some implementations, the strength of this transformation and the degree of its applicability can be enhanced by performing additional auxiliary transformations (described below), e.g., function specialization and loop unrolling. The auxiliary transformations, in turn, can be made stronger after this transformation is run. In some implementations, two or more auxiliary transformations can be performed one after other in a loop.

Transformation Sequence 2 (Function Specialization)

A function in the input program code 104 can be specialized for each call site, e.g., by hard-coding the constant parameters from the call site into a body of the function. Those constant parameters then can be used to simplify or reduce the IR of the function, such as pruning the IF statements inside the function based on the hard-coded constant parameters. For example, consider the following MATLAB® function:

```
function y=foo(c,x)

y=c(x);

end
```

The indexing expression in c(x) is not constant, because it is derived from the input x. However, if, for example, there are two calls to this function and in both calls, the caller may pass constant values to foo:

```
foo(c1, 1);

. . .

foo(c2, 2);
```

In such a situation, two copies (specializations) of foo can be produced, replacing x with one copy and with 2 in the other:

```
function y=a_foo(c)

y=c(1);

end function y=b_foo(c)

y=c(2);

end
```

Note that the cell array index is now constant in both specializations.

Transformation Sequence 3 (Loop Unrolling)

If the indexing expression includes a FOR loop index variable, the loop may be unrolled whenever possible, with the index variable replaced with explicit values for each iteration.

Transformation sequence 1 may be invoked on the expression, with the aim of producing a constant value.

These transformations may be invoked repeatedly until no more constant index is discovered.

Those of skill in the art will appreciate that more than the above described classes might be used to perform some classifications. For example, regular/table structure classes and soft homogenizable classes may be used in some implementations, each with associated classification rules, program transforms, and intermediate representation array-to-output code translation rules.

In some implementations, type inference engine 114 may employ heuristics to determine the classification of a cell array 106, e.g., as homogeneous, heterogeneous, or other. For example, type inference engine 114 may consider the properties, e.g., class, size, or complexity, of the cell array variables and other factors such as how the cell array is used in the input. As described above, a cell array 106 may have an ambiguous classification, such that it may be homogeneous in one situation and heterogeneous in another situation. For example, consider the cell array {1 [2 3]}. This cell array 106 can be classified as a heterogeneous 1×2 cell array whose first variable is double scalar and whose second variable is a 1×2 array of doubles. However, if the source code of input 104 indexes into this cell array 106 with an index whose value is determined at run time, the cell array may be classified as a homogeneous cell array. The variables of this cell array comprise variable-size arrays of doubles with an upper bound of 2.

For example, the example below benefits from applying heuristic rules as to ensure that x is classified as homogeneous so that the subsequent usage of "z" does not fail to compile:

x={1 2 3};

foo(x, i);

function y=foo(z, i)

y=z{i};

In some implementations, type unification techniques can be used to reconcile the classifications of different cell array variables in case the classification engine arrived at different classifiers for logically related (for instance, assignment-connected) cell array variables or entities.

Once the cell array(s) 106 in input program code 104 are classified, in step 408, the IR, e.g., the DTIR 111 generated by the IR builder 110, can be modified (step 410) based on the classification. The modified IR can then be converted (step 412) into STIR 112, which can be optimized (step 414). For example, data type mismatches in the STIR 112 can be eliminated, e.g., by using one or more of the FOR loop unrolling and constant index propagating and/or constant folding optimizations described above. In step 416, the optimized IR, e.g., the STIR 112, may be translated, e.g., using the ST program generator 120, into the output program code 102 including or generating one or more statically typed array 122 corresponding to dynamically typed arrays 106 in the input program code 104. Each of these steps will now be described in greater detail.

In some implementations, IR builder 110 may first model the determined behaviors of input program code 104 as DTIR 111, e.g., guided by the received program inputs 126. Then, IR builder 110 may automatically build the STIR 112, which models the same behaviors as the DTIR, but is consistent with the target STPL. The STIR 112 can then be translated into program code 102 in the target STPL As noted previously, the source DTPL defines the behavior of input program code 104 and the cell array(s) 106, and may comprise any DTPL that supports mathematical arrays. Suitable DTPEs that provide applicable source languages include Simulink®, Stateflow® and MATLAB®, from the MathWorks, Inc. of Natick, Mass., yet those skilled in the art will recognize that these are examples of applicable environments and are not intended to be an exhaustive list of applicable source languages.

In some implementations, STIR 112 may include a control flow graph (CFG) that captures the semantics of the cell array(s) 106. An intermediate representation modeling a cell array, generally, may include metadata identifying the source(s) or other attributes of the content in the intermediate representation, and/or metadata about the cell array, such as, how the cell array is accessed, and/or the data type(s) of the cell array variables, etc.

Conventional implementations for the execution of programs in DTPL require embedding the type metadata in the description of variables and values during program execution. An example of such metadata is the VARIANT type in the COM (Common Object Model by Microsoft®) where the entire classification of the data, such as the value type, size, and structure is embedded inside or alongside with the value. Another example is the mxArray data structure as employed by the MATLAB programming environment.

In some implementations, in contrast to the conventional implementation, implementations consistent with this disclosure may embed the metadata in the translated program code, e.g., the statically typed code 102. For example, the metadata can be in the form of static typing of variables. The implementations may also simplify the metadata required at values and variables to contain only the aspects that are not statically determined at runtime. Furthermore, the implementations may be free of metadata. In an example, if a cell array is classified as a fixed size homogeneous cell array of four elements, each containing a floating point number, then the runtime representation of that cell array would be just four double-precision floating point numbers residing in the computer memory, without any extra data describing the type or size or structure of those data. This is because all the code that accesses the data operates on those data directly and the code has been specialized and check to operate correctly on those data.

In some implementations, when translating a source program, e.g., an input, from a DTPL to a STPL, variables in the source program that are related based on their use in expressions or arrays within the program may be assigned different data types. The assignment can be based on classifications of these variables that can produce different class designations. As a result, the initially generated STIR 112 may contain a number of type mismatches between or among the related variables. In order to achieve good code quality, IR builder 110, e.g., in optimization step 412, may access a set of optimization tools to address the data type mismatches. Examples of the optimization tools can include type unification, cast elimination, lowering, i.e., breaking a complicated operation into simpler operations, etc. For example, IR builder 110 may eliminate type casts using a type unification scheme, e.g., by setting mismatched types to common types suitable for all of the related variables. As a result, an optimized STIR 112 that meets expectations, e.g., as defined by preferences 130, etc. for quality of the generated program code 102 is generated. In some implementations, unification can be used to make the types of left hand side and right hand side of the assignment to be identical, and the newly used type can be some type, e.g., a supertype, that is broad enough to encompass both of the original types of the left and right hand sides. An example of applying the type unification is described below.

Consider the assignment y=x, where x is a 1×5 cell array and y is a 1×: ? cell array with the same element type, where :? denotes size that can change at run time. There is a type mismatch in this assignment. Normally, this requires a cast. However, unifying the types of both x and y to 1×: ? eliminates the need for the cast. Note that 1×: ? is more general than 1×5, so the type of x can safely be changed from 1×5 to 1×: ?.

Once the STIR 112 has been optimized, the ST program generator 120 may translate (step 414) the modified STIR 112 into output program code 102. The generated output program code 102 is output from code generator 108, and can be made available for additional processing, or for use in the STPE. The generated program code 102 may be any statically typed source code, object code, compiled executable, hash tag data structure or library forming an executable of a model, or any other form of executable instructions. Translation can include representing the classified cell arrays as arrays or structures (e.g., such as C, C++, Verilog® or HDL arrays and structures) or hash tables in the code written in the STPL.

A set of translation rules 136 may be utilized by the ST program generator 120 to represent each of the cell array classifications described above into one or more efficient representation of such a cell array in STPL program code 102. One exemplary set of translation rules 136 may include the following:

Rule 1. Homogeneous arrays can be represented as traditional C arrays or arrays of pointers, with sparsely populated homogeneous arrays represented as sparse arrays, hash tables, or search trees.

Rule 2. Soft homogenizable cell arrays can be represented as traditional arrays of a generalized base type, such as a supertype of types of all cell array variables, or a generalized array of a base type whose array size is compatible with sizes of all variables. The representation may involve separation of heterogeneous storage of with concrete types of variables, and homogeneous storage with generic types, or pointers to generic types. A supertype can represent any data that can be represented by a subtype. For example, if a cell array contains two matrices of size 2×2 and 5×5, it can be generalized to a cell array containing two dynamic sized matrices, because a dynamic sized matrix can be either 2×2 or 5×5. In some implementations, a dynamically sized matrix type is denoted using a ":" symbol, such as :5×:5, meaning a matrix with up to five elements in each dimension; or :?×:?, meaning a dynamically sized matrix whose size is not determined, e.g., can be any barring the memory size of the computer.

Rule 3. Regularly structured arrays can be represented as arrays of structures and exploded to variables.

Rule 4. Heterogeneous cell arrays can be represented as traditional C structures.

The translation process can produce suitable traceability information to allow reverse mapping from the generated program code 102 or data back to the source input program code 104 in the source programming language. The mapping can provide support for high-level debugging, code or data instrumentation, profiling or introspection of programs that use cell arrays.

The foregoing disclosure provides illustration and description, but is not intended to be exhaustive or to limit the implementations to the precise form disclosed. Modifications and variations are possible in light of the above disclosure or may be acquired from practice of the implementations.

III. Examples of Classification and Translation

A few examples of the classification and translation methods are presented below.

Example 1

The cell array is classified as homogeneous, and translated into a traditional array.

MATLAB source code for a homogeneous array:

```
x = {1,2,3,4,5,6,7,8,9};
...
function y = process (x, idx)
    ...
    y = x{idx} + x{idx+1};
end
```

Generated C code in the output statically typed language contains an array of double type used for the variable "x":

```
double x[9];
static double process(const double x[9], double idx)
{
return x[(int)idx – 1] + x[(int)idx];
}
```

Example 2

The cell array is classified as heterogeneous and translated into a C structure. Source code includes the following array, which is classified as belonging to a heterogeneous class.

```
x = {'add', d1, 'multiply', d2, 'add', 1, 'add', 1};
...
function y = process (x)
    ...
    y = 0;
    for i = 1:2:numel(x)
        if ~strcmp(x{i}, 'add')
            y = y + x{i+1};
        elseif ~strcmp(x{i}, 'multiply')
            y = y * x{i+1};
        end
    end
end
```

C code generated in the STPL contains a C structure type that is used for the variable "x":

```
typedef struct {
    char f1[3];
    double f2;
    char f3[8];
    double f4;
    char f5[3];
    double f6;
    char f7[3];
```

```
        double f8;
    } cell_0;
    static double process(const cell_0 x)
    {
        ...
    }
```

Example 3

The array is soft homogenizable, and is translated into an array of a generic base type. The input code contains the following array, which is classified as soft homogenizable.

```
x = {'hello', 'world', '!'};
% user explicitly chooses to make the cell array 'x' homogeneous
coder.varsize('x');
...
function y = process (x, idx)
    coder.inline('never');
    y = x{idx};
end
```

C code generated contains a variable-sized array emxArray_cell_wrap_0_1x3 that, in turns, contains a variable-sized array cell_wrap_0. Cell_wrap_0 is a generalized type that is compatible with both 5-element and 1-element strings that are contained in the variable "x".

```
struct cell_wrap_0
{
    char data[5];
    int size[2];
};
struct emxArray_cell_wrap_0_1x3
{
    cell_wrap_0 data[3];
    int size[2];
};
static void process(const cell_wrap_0 x_data[ ], const int x_size[2],
double idx, char y_data[ ], int y_size[2])
{
...
}
```

IV. Conclusion

It will be understood by those skilled in the art that each of the functional units shown in the figures may comprise registers and combinational logic configured and arranged to produce sequential logic circuits. They may alternatively comprise software modules or libraries containing program instructions pertaining to the methods described herein, that may be stored on computer readable media, such as computer readable medium 230, and executable by one or more processing elements, such as CPU 202. Also, they are illustrated as separate computational entities merely for the purpose of clarity, without intent to suggest that they must be configured as such. Other computer readable media may also be used to store and execute these program instructions. Nonetheless, those skilled in the art will recognize that various combinations of software and hardware, including firmware, may be utilized in various implementations.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

Although in some of the examples, cell arrays are provided in the input, the input can also be free of explicitly containing any cell arrays. Instead, cell arrays can be generated when the input is executed. The input can be analyzed and the systems, methods, and rules discussed above can be applied to those arrays to be generated by executing the input.

Examples

The following examples (9 embodiments) implement one or more aspects of the methods and/or systems of the present disclosure. These examples are non-limiting examples. Features of different examples may be combined in other implementations. Features of each embodiment may be modified or removed in other implementations.

In one embodiment (Embodiment 1), the method of generating, e.g. by one or more processors, second program code from first program code might comprise (only) the following steps:
  analyzing the first program code;
  generating at least one intermediate representation, e.g. based on the first program code;
  generating the second program code based on the intermediate representation.
Preferably the first program code of the method contains at least one dynamically typed array.

In one embodiment (Embodiment 2), the method of Embodiment 1 might comprise:
  identifying at least one dynamically typed array having at least a plurality of native elements, each element having a native length, wherein at least one of the native elements has a native length that is different than the native length of at least one other native elements, the elements being preferably of the same (data) type;
  determining a maximum length of the native elements;
  generating a static array for holding data of the dynamically typed array in the intermediate representation, the static array having intermediate elements with a constant length, preferably of the same (data) type, wherein the constant length is greater or equal to the maximum length.

In one embodiment (Embodiment 3), the intermediate elements and/or the native elements of Embodiment 2 are arrays, e.g. of characters.

In one embodiment (Embodiment 4), the method of any one of the Embodiments 1 to 3 might comprise:
  Identifying at least one variable in the first program code, the variable being used to dynamically index native element in at least one array, e.g. in at least one dynamically typed array, of the first program code, Determining a set of constant, preferably numeric, values for the variable;

Generating a (static) array for holding data of the dynamically typed array in the intermediate representation, the static array comprising intermediate elements;

Generating code in the intermediate representation for statically indexing at least some of the intermediate elements, wherein the set of constant values is used as indices.

In one embodiment (Embodiment 5), the method of Embodiment 4 might comprise:

Analyzing a loop of the first program code, the number of times the loop being executed being defined by at least one constant numerical boundary value;

Determining the set of constant values based at least partially on the constant numerical boundary value.

In one embodiment (Embodiment 6), loop of Embodiment 6 is a count controlled loop and the variable is the counter of the count controlled loop.

In one embodiment (Embodiment 7), the method of at least one of the Embodiments 1 to 6 might comprise:

Identifying a native function in the first program code, the native function indexing native element in at least one array, e.g. in at least one dynamically typed array, of the first program code, the native function being called from within a count controlled loop, wherein the counter of the count controlled loop is used as an input value of the native function;

Generating a intermediate function in the intermediate representation, the intermediate function having the functionality of the native function and having at least one input parameter;

Substituting the count controlled loop in the intermediate representation by a sequence of statements, the sequence of statements comprising a plurality of function calls to the intermediate function, each function call having at least one constant numeric value as input to the input parameter of the intermediate function.

In one embodiment (Embodiment 8), the method of at least one of the Embodiments 1 to 7 comprises:

Identifying a count controlled loop in the first program code, the counter of the count controlled loop being used for indexing native element in at least one array, e.g. in at least one dynamically typed array, of the first program code, Generating a (static) array for holding data of the dynamically typed array in the intermediate representation, the static array comprising intermediate elements;

Substituting the count controlled loop in the intermediate representation by a sequence of statements, wherein at least some of the statements (statically) index the intermediate elements of the static array.

In one embodiment (Embodiment 9), the method of at least one of the Embodiments 1 to 8 comprises:

Identifying a native function in the first program code, the native function having at least one input parameter and indexing native element in at least one array, e.g. in at least one dynamically typed array, of the first program code, the native function being called a plurality of times with different (static) input values as input parameter, Generating a plurality of intermediate functions for each function call directed towards the native function in the intermediate representation, the intermediate functions having a similar functionality as the native function, wherein in each intermediate function the input parameter is substituted by one static input value of the plurality of (static) input values.

Instructions to implement one of the Embodiments 1 to 9, when being executed can be stored on a non-transient computer readable medium.

Generally, the adjective "native" and "intermediate", in particular in connection with the elements and/or lengths and/functions are to be understood in a non-limiting fashion and are only used to differentiate between elements/lengths/functions belonging to the first code and the intermediate representation respectively.

What is claimed is:

1. A method, comprising:
generating, by one or more processors, second program code in a statically typed programming language, from first program code in a programming language supporting dynamic typing, the first program code containing or, when executed, generating or operating on a dynamically typed array, the generating the second program code comprising:
classifying, by the one or more processors, the dynamically typed array into one of multiple categories, based on an array content, an array usage, or a user input, and
the multiple categories including a homogeneous category, a heterogeneous category, a table structure category, or a soft homogenizable category,
selecting, by the one or more processors, a translation rule for translating the dynamically typed array into a statically typed representation based on a category in which the dynamically typed array is classified,
a first translation rule being selected when the dynamically typed array is classified into a first category of the multiple categories, or
a second translation rule, different than the first translation rule, being selected when the dynamically typed array is classified in a second category, different than the first category, of the multiple categories; and
generating, by the one or more processors, the second program code in the statically typed programming language based on the selected translation rule.

2. The method of claim 1, wherein the classifying comprises selecting one or more classification rules from a set of rules for application based on a performance preference for the second program code.

3. The method of claim 1, wherein the classifying comprises selecting one or more classification rules from a set of rules for application based on a visual readability preference for the second program code.

4. The method of claim 1, comprising assigning to the dynamically typed array a homogeneous or heterogeneous classification from user input that overrides any automated classification operations performed by the one or more processors.

5. The method of claim 1, comprising generating an intermediate representation from the first program code and modifying the intermediate representation based on the classification.

6. The method of claim 5, wherein generating the intermediate representation comprises:
generating a dynamically typed intermediate representation of the first program code;
transforming the dynamically typed intermediate representation into a statically typed intermediate representation; and wherein generating the second program code comprises converting the statically typed intermediate representation into the second program code in a statically typed programming language.

7. The method of claim 1, comprising determining constant indexing values for operations on the dynamically typed array.

8. The method of claim 1, comprising converting a dynamically typed array into a statically typed intermediate representation including an array, a structure, or hash table data structure containing statically typed elements.

9. The method of claim 8, comprising using constant propagation or constant folding to aid in converting the first program code operating on the dynamically typed array into the statically typed intermediate representation.

10. The method of claim 8, comprising using function specialization to aid in converting the first program code operating on the dynamically typed array into the statically typed intermediate representation.

11. The method of claim 8, comprising using loop unrolling to aid in converting the first program code operating on the dynamically typed array into the statically typed intermediate representation.

12. The method of claim 8, comprising using type unification to aid in converting the first program code operating on the dynamically typed array into the statically typed intermediate representation.

13. The method of claim 1, comprising analyzing the first program code to determine if index values used to index into the dynamically typed array are constant and remain constant during execution of the first program code, and using those index values that are constant to aid in the classifying.

14. The method of claim 1, wherein the generating comprises determining a static data type for each dynamically typed array, then using the determined static data type to aid in generating the second program code.

15. The method of claim 1, wherein the generating comprises applying type inference techniques to determine types for each dynamically typed array, and using the types in generating the second program code.

16. The method of claim 1, wherein the second program code comprises a representation of the dynamically typed array, and when the second program is executed, the representation in computer memory does not contain any metadata.

17. The method of claim 1, where the multiple categories include the homogenous category and the heterogenous category,
where the first category is the homogenous category and the first translation rule is selected when the dynamically typed array is classified into the homogenous category, and
where the second category is the heterogenous category and the second translation rule is selected when the dynamically typed array is classified into the heterogenous category.

18. A non-transient computer readable medium comprising program instructions, the program instructions comprising:
one or more instructions which, when executed by one or more processors cause the one or more processors to:
generate second program code in a statically typed programming language, from first program code in a programming language supporting dynamic typing, the first program code containing or, when executed, generating or operating on a dynamically typed array, the one or more instructions, when executed by the one or more processors to generate the second program code, cause the one or more processors to:
classify the dynamically typed array into one of multiple categories, based on an array content, an array usage, or a user input,
the multiple categories including a homogeneous category, a heterogeneous category, a table structure category, or a soft homogenizable category,
select a translation rule for translating the dynamically typed array into a statically typed representation based on a category in which the dynamically typed array is classified,
a first translation rule being selected when the dynamically typed array is classified into a first category of the multiple categories, or
a second translation rule, different than the first translation rule, being selected when the dynamically typed array is classified in a second category, different than the first category, of the multiple categories; and
generate, the second program code in the statically typed programming language based on the selected translation rule.

19. The non-transient computer readable medium of claim 18, wherein the instructions further comprise instructions, which when executed by the one or more processors to generate the second program code, cause the one or more processors to:
analyze the first program code to determine if index values used to index into the dynamically typed array are constant and remain constant during execution of the first program code, and using those index values that are constant to aid in the classifying.

20. A computer-implemented system for generating program code, comprising:
one or more processors configured to:
generate second program code in a statically typed programming language, from first program code in a programming language supporting dynamic typing, the first program code containing or, when executed, generating or operating on a dynamically typed array, the one or more processors, when generating the second program code, are to:
classify the dynamically typed array into one of multiple categories, based on an array content, an array usage, or a user input,
the multiple categories including a homogeneous category, a heterogeneous category, a table structure category, or a soft homogenizable category,
select a translation rule for translating the dynamically typed array into a statically typed representation based on a category in which the dynamically typed array is classified,
a first translation rule being selected when the dynamically typed array is classified into a first category of the multiple categories, or
a second translation rule, different than the first translation rule, being selected when the dynamically typed array is classified in a second category, different than the first category, of the multiple categories; and
generate the second program code in the statically typed programming language based on the classifying.

* * * * *

UNITED STATES PATENT AND TRADEMARK OFFICE
CERTIFICATE OF CORRECTION

PATENT NO. : 10,216,501 B2
APPLICATION NO. : 15/168990
DATED : February 26, 2019
INVENTOR(S) : Arnab De et al.

It is certified that error appears in the above-identified patent and that said Letters Patent is hereby corrected as shown below:

In the Specification

Column 5, Line 30 reads:
"medium drive 210 that are inter connected by a system bus"
Should read:
--medium drive 210 that are interconnected by a system bus--

Column 10, Lines 8-9 read:
"x = {John', 32; 'Steve', 44; 'Jina', 11}"
Should read:
--x = {'John', 32; 'Steve', 44; 'Jina', 11}--

Column 11, Line 15 reads:
"Example; Scalars of Double Type Produce a Homoge-"
Should read:
--Example: Scalars of Double Type Produce a Homoge- --

Column 11, Line 39 reads:
"Example; A Soft Homogeneous Cell Array Of Matrices"
Should read:
--Example: A Soft Homogeneous Cell Array Of Matrices--

Column 14, Line 5 reads:
"translated into program code 102 in the target STPL As"
Should read:
--translated into program code 102 in the target STPL. As--

Signed and Sealed this
Eighteenth Day of August, 2020

Andrei Iancu
*Director of the United States Patent and Trademark Office*